(12) United States Patent
Falkenstein (10) Patent No.: US 9,090,242 B2
(45) Date of Patent: Jul. 28, 2015

(54) METHOD FOR COORDINATING AT LEAST ONE DRIVE UNIT

(75) Inventor: Jens-Werner Falkenstein, Aalen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 520 days.

(21) Appl. No.: 13/382,873

(22) PCT Filed: Jul. 5, 2010

(86) PCT No.: PCT/EP2010/059533
§ 371 (c)(1),
(2), (4) Date: Mar. 14, 2012

(87) PCT Pub. No.: WO2011/003848
PCT Pub. Date: Jan. 13, 2011

(65) Prior Publication Data
US 2012/0166060 A1    Jun. 28, 2012

(30) Foreign Application Priority Data
Jul. 10, 2009    (DE) .......................... 10 2009 027 603

(51) Int. Cl.
| | |
|---|---|
| G06F 19/00 | (2011.01) |
| B60W 10/06 | (2006.01) |
| B60W 10/08 | (2006.01) |
| B60W 20/00 | (2006.01) |
| H04L 12/40 | (2006.01) |
| B60W 50/00 | (2006.01) |

(52) U.S. Cl.
CPC ............... *B60W 10/06* (2013.01); *B60W 10/08* (2013.01); *B60W 20/00* (2013.01); *H04L 12/40013* (2013.01); *B60W 2050/0083* (2013.01); *F02D 2250/18* (2013.01); *Y02T 10/6286* (2013.01)

(58) Field of Classification Search
CPC ..... B60W 10/06; B60W 20/00; B60W 10/08; B60W 2050/0083; B60W 2710/0666; B60W 2720/106; F02D 2250/18; F02D 41/0042; F02D 41/1497
USPC ........................................ 701/22, 70, 102, 51
See application file for complete search history.

(56) References Cited

U.S. PATENT DOCUMENTS 5,351,776 A * 10/1994 Keller et al. ..................... 701/70
5,481,456 A *  1/1996 Ogura ................................ 701/1
(Continued)

FOREIGN PATENT DOCUMENTS

| CN | 1433503 | 7/2003 |
|---|---|---|
| CN | 1659054 | 8/2005 |

(Continued)

*Primary Examiner* — Redhwan k Mawari
(74) *Attorney, Agent, or Firm* — Kenyon & Kenyon LLP (57) ABSTRACT

A method for coordinating at least one drive unit of a vehicle, a control unit designed as a drive unit control unit (6, 8) being assigned to this at least one drive unit, a higher-level control unit (4) being provided, and information being exchanged between the control units, at least one operating parameter for an operating range of the at least one assigned drive unit being transmitted by at least one drive unit control unit (6, 8) to the higher-level control unit (4) for the purpose of carrying out the method, a setpoint operating point for the at least one drive unit being ascertained by the higher-level control unit (4) on the basis of the at least one received operating parameter, and the ascertained setpoint operating point being transmitted to the at least one drive unit control unit (6, 8) together with the at least one operating parameter.

19 Claims, 7 Drawing Sheets

(56) References Cited

U.S. PATENT DOCUMENTS

2008/0308066 A1    12/2008   Martin et al.
2012/0166060 A1*   6/2012    Falkenstein .................... 701/99

FOREIGN PATENT DOCUMENTS

| | | |
|---|---|---|
| CN | 101415592 | 4/2009 |
| DE | 42 39 711 | 6/1994 |
| DE | 196 46 387 | 5/1998 |
| DE | 197 55 311 | 6/1999 |
| DE | 10 2008 022 082 | 12/2008 |
| EP | 0 507 072 | 10/1992 |
| EP | 1 065 091 | 1/2001 |
| JP | 2012-532065 | 12/2012 |
| WO | WO 01/54940 | 8/2001 |

* cited by examiner

METHOD FOR COORDINATING AT LEAST ONE DRIVE UNIT

BACKGROUND OF THE INVENTION

1. Field of the Invention

The present invention relates to a method and a system for coordinating at least one drive unit.

2. Description of Related Art

Drivetrains which use multiple drive units are known for vehicles. In hybrid vehicles, for example, an internal combustion engine and at least one electric motor act together as provided drive units to generate a driving torque. Multiple control units, which communicate with each other via a bus system, are used for this purpose, it being possible in many cases to use a higher-level control unit which coordinates the functions of the drive units. The drive units are then assigned one or more drive unit control units. One of the drive unit control units may additionally perform the tasks of the higher-level control unit.

The higher-level control unit is designed to coordinate functions of the drive units and to specify setpoint operating points, typically setpoint torques, for the drive units. For this purpose, the drive unit control units may transmit operating parameters as information to the higher-level control unit via the instantaneously possible operating ranges of the drive units and, if necessary, additionally via instantaneously optimum operating ranges of the drive units. The higher-level control unit uses this information as basic conditions for coordination for the purpose of setting setpoint operating points.

The instantaneously possible and optimum operating ranges of the drive units change over time, e.g., due to dynamic effects in the air system of the internal combustion engine, which may be referred to as the turbocharger lag, among other things, or due to the activation and deactivation of ancillary units which are connected to an on-board electrical system together with electric motors.

Time delays may occur in the communication between the control units, i.e., between the drive unit control units and the higher-level control units, so that the operating ranges reported by the drive units reach the higher-level control unit after a time delay. In most cases, the reported operating ranges in the higher-level control unit typically do not match the instantaneous operating ranges ascertained in the drive unit control units, since the reported operating ranges are out of date, due to the time delay in the higher-level control unit.

Consequently, the higher-level control unit usually provides the drive units with setpoint operating points which are based on these outdated, reported operating ranges. The setpoint operating points are reported by the higher-level control unit to the drive unit control units, which results in a new time delay. Due to this double delay, a setpoint operating point reported to the drive unit control unit may lie outside the instantaneously possible operating range ascertained in the drive unit control unit, which may make it impossible to provide this reported setpoint operating point, thus having a negative effect on the quality of control. Even if the reported, delayed setpoint operating point may be provided, it may lie outside an instantaneously optimum operating range ascertained by the drive unit control unit, even though the higher-level control unit has requested an optimum operating range.

A control method for a system in a motor vehicle having a central unit and a plurality of modules which are connected to the central unit is known from the published German patent application document DE 196 46 387 A1. An item of activation information is stored in each module, an item of control information being transmitted from the central unit to the modules for the purpose of activating modules. Only the addressed modules whose activation information has a predefined relationship with the transmitted control information are activated.

A method for transmitting information in motor vehicles is described in the published German patent application document DE 197 55 311 B4. At least one control unit is designed to supply information within the scope of messages, at least two operating variables, which do not occur at the same time, and at least one further item of information being supplied, the at least one further item of information being transmitted within the scope of the message for the operating variable which is not currently present.

The subject matter of the published German patent application document DE 10 2008 022 082 A1 is a method for operating a drivetrain in a vehicle which has an electric drive and an internal combustion engine. According to the method, a torque is provided for driving the vehicle by the electric drive as well as by the internal combustion engine, the internal combustion engine torque being varied within a permissible range. If the internal combustion engine is operated at an edge of the range, a check is performed to determine whether a selected operating condition may be provided by the internal combustion engine.

BRIEF SUMMARY OF THE INVENTION

The present invention enables, among other things, the coordination of drive units having multiple communicating control units, and it may be used, for example, in developing a drivetrain control system for hybrid vehicles. At least one control unit, which may also be referred to as the drive unit control unit, is usually assigned to a drive unit. One of the aforementioned drive unit control units may be simultaneously provided as the higher-level control unit and/or assume its function.

According to the present invention, a higher-level control unit or a drive unit control unit which handles this task usually receives reported possible and/or reported optimum operating ranges, typically base torques, which are reported by the drive unit control units after a time delay. Based on these operating ranges, the higher-level control unit determines setpoint operating points, such as setpoint torques, for the drive unit control units. Furthermore, at least one limit of a possible and/or optimum operating range originally reported by a drive unit control unit together with the setpoint operating point is reported back to at least one drive unit control unit. In an embodiment of the method, different torques, for example base torques, setpoint torques as well as maximum torques and/or minimum torques, are typically exchanged as limits in the form of operating parameters during communication between the control units.

In addition to the setpoint operating point including the reported-back possible and/or reported-back optimum operating range, the drive unit control unit also receives information on the basic conditions which were valid in the higher-level control unit for determining the setpoint operating point.

In one embodiment, the at least one drive unit control unit may correct the setpoint operating point. This correction may be based on the usually double-delayed limit reported back by the higher-level control unit in the form of an operating parameter of the reported-back possible and/or reported-back optimum operating range. A typically non-delayed limit as a further operating parameter of the operating range that is currently ascertained in the drive unit control unit, the instantaneously possible operating range and/or the instantaneously optimum operating range may also be used for correction.

In a further embodiment, the higher-level control unit may influence a correction of the setpoint operating point in the drive unit control unit. To do this, for example, the higher-level control unit may set limits for the correction or block the correction in determined operating states of a drivetrain and/or an assigned drive unit control unit, for example, during rotational speed-limiting, ESP or transmission interventions, if an idle controller is active or for forming the driving torque for reasons of driving comfort. The setpoint operating point predefined by the higher-level control unit may thus be set as precisely as possible.

Different methods for determining the correction may be selected, depending on the operating state of the drivetrain and/or a drive unit. The correction may also be made continuously. It is also possible for the drive unit control unit to report the correction of the setpoint operating point to the higher-level control unit and/or to at least one further drive unit control unit. This further drive unit control unit may also correct a setpoint operating point assigned to it, based on the received or reported correction.

The present invention makes it possible to achieve optimum dynamic coordination of multiple drive units having multiple control units which communicate with each other. Negative effects of time delays in the communication between the control units are minimized.

The present invention may be used in all motor vehicle drives in which at least one drive unit and multiple control units are used. The tasks of the higher-level control unit may be integrated, for example, into a drive unit control unit designed as an electric motor control unit (MCU).

The described system is designed to carry out all steps in the provided method. Individual steps in this method may also be carried out by individual components of the system. Furthermore, functions of the system or functions of individual components of the system may be implemented as method steps. It is also possible to implement method steps as functions of individual components of the system or as functions of the overall system.

Further advantages and embodiments of the present invention are derived from the description and the attached drawings.

It is understood that the aforementioned features and the features still to be explained below may be used not only in the combination specified in each case but also in other combinations or alone without leaving the scope of the present invention.

DETAILED DESCRIPTION OF THE INVENTION

The present invention is illustrated schematically in the drawings on the basis of specific embodiments and is described in detail below with reference to the drawings.

The figures are described cohesively and comprehensively; the same reference numerals identify the same components.

Figure 1:
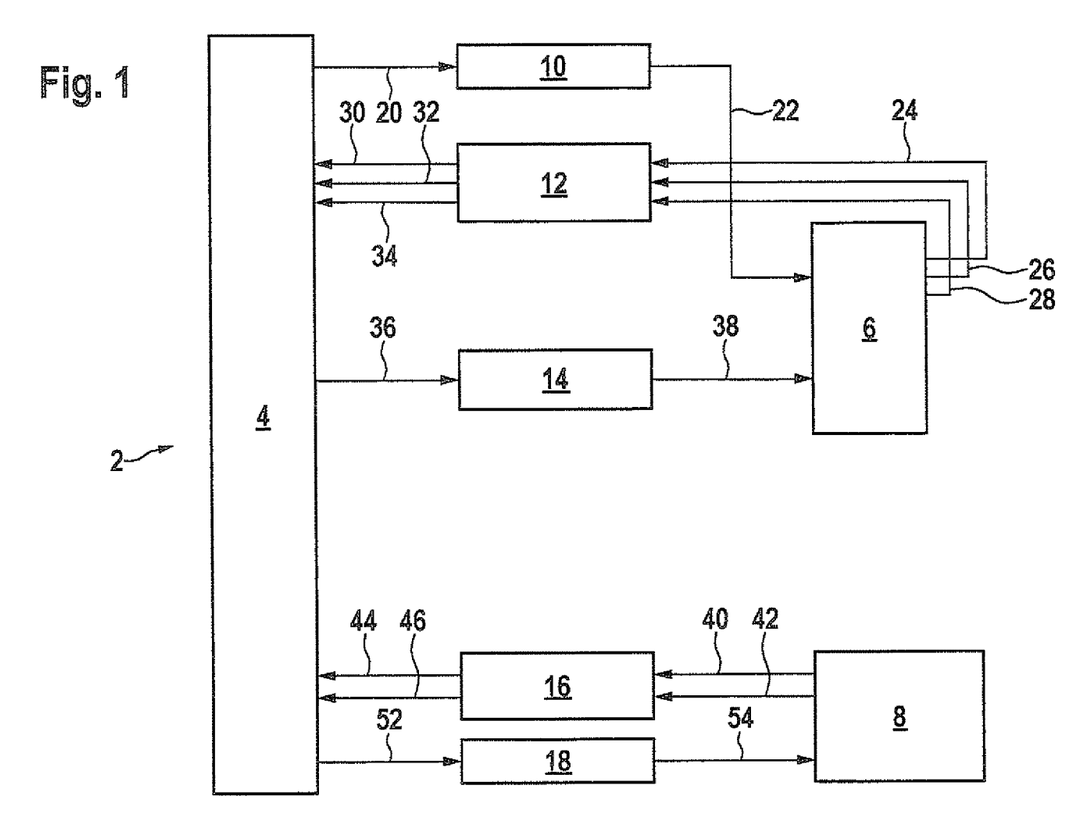
FIG. 1 shows a schematic representation of a system which includes control units for coordinating drive units of a vehicle, different operating parameters which are exchanged between the control units during conventional operation being illustrated.

System 2, which is schematically illustrated in FIG. 1, includes a higher-level control unit 4 (HCU), a second control unit, which in this case is designed as a drive unit control unit 6 for an internal combustion engine, as well as a third control unit, which in this case is designed as a drive unit control unit 8 for an electric motor of the vehicle.

The representation in FIG. 1 also shows a first delay 10 (delay 1), a second delay 12 (delay 2), a third delay 14 (delay 3), a fourth delay 16 (delay 4) and a fifth delay 18 (delay 5).

The drivetrain, which is not illustrated in FIG. 1, includes an internal combustion engine as the first drive unit, for example a gasoline engine, having an electronic gas pedal (e-gas) which has an electronic throttle valve and whose flywheel is coupled to an electric motor (crankshaft starter generator) as the second drive unit. During operation, the actual torques of the internal combustion engine and the electric motor add up to an actual torque of the overall drive, i.e., a total torque of the internal combustion engine and the electric motor. The internal combustion engine is activated by an internal combustion engine control unit (ECU) as first drive unit control unit 6, and the electric motor (EIM) is activated by an electric motor control unit (MCU) as second drive unit control unit 8. Functions of the aforementioned drive units and drive unit control units 6, 8 are coordinated by higher-level control unit 4 (HCU, hybrid control unit). All control units are interconnected via a bus system; the time delays which occur during communication between the control units are simulated by delays 10, 12, 14, 16, 18 (delay 1 through delay 5), each lasting 10 milliseconds, in the simulation model illustrated in FIG. 1 for system 2.

For the internal combustion engine, higher-level control unit 4 (HCU) specifies a lead setpoint torque HCU_trqLeadEng 20 as the operating parameter for a setpoint operating range, which in this case acts upon the slow air path of the internal combustion engine and influences the setpoint charge. Delayed lead setpoint torque ECU_trqLeadEng 22 arises on the basis of first delay 10. Due to dynamic effects in the intake manifold of the internal combustion engine and delay 10 (delay 1), an actual charge, and thus base torque ECU_trqBs 24, follows lead setpoint torque HCU_trqLeadEng 20 after a time delay. During ideal operation, i.e., at an ideal ignition angle, the internal combustion engine generates base torque ECU_trqBs 24 as an operating parameter. By retarding the ignition angle, the actual torque of the internal combustion engine may be reduced in relation to base torque ECU_trqBs 24, but only up to minimum base torque ECU_ trqBsMin 26, which is defined by the combustibility limit. The efficiency of the internal combustion engine also deteriorates.

The torque may be further reduced by an injection blank-out of individual cylinders, which, however, is associated with increased exhaust gas emissions. The actual torque of the internal combustion engine may be reduced by injection blank-out of all cylinders up to minimum torque ECU_trqMin 28, which corresponds to the loss torque of the internal combustion engine. The three aforementioned operating parameters are transmitted from first drive unit control unit 6 to higher-level control unit 4 via second delay 12, delayed reported base torque HCU_trqBs 30 being derived from base torque ECU_trqBs 24 as an operating parameter, delayed reported minimum base torque HCU_trqBsMin 32 being derived from minimum base torque ECU_trqBsMin 26, and delayed reported minimum torque HCU_trqMin 34 being derived from minimum torque ECU_trqMin 28.

The following applies:

$$ECU\_trqMin < ECU\_trqBsMin < ECU\_trqBs \quad (F1)$$

Higher-level control unit 4 (HCU) specifies a setpoint torque HCU_trqDesEng 36 as the setpoint operating point for the internal combustion engine, which is received after a time delay by drive unit control unit 6 of the internal combustion engine as setpoint torque ECU_trqDesEngIn 38, and thus as the delayed setpoint operating point, on the basis of third delay 14, which occurs during communication. If setpoint torque ECU_trqDesEngIn 38 corresponds to base torque ECU_trqBs 24, the internal combustion engine is operated at an ideal ignition angle and ideal efficiency. If setpoint torque ECU_trqDesEngIn 38 is less than base torque ECU_trqBs 24, the ignition angle or injection blank-out is retarded, which may result in decreased efficiency and/or emissions. If setpoint torque ECU_trqDesEngIn 38 is greater than base torque ECU_trqBs 24, the setpoint torque may not be provided by the internal combustion engine.

The operating parameters ascertained for instantaneous limits in drive unit control unit 6 (ECU) for the internal combustion engine, i.e., base torque ECU_trqBs 24, minimum base torque ECU_trqBsMin 26 and minimum torque ECU_trqMin 28, specify the instantaneously possible operating range of the internal combustion engine. Instantaneous base torque ECU_trqBs 24 corresponds to the instantaneously optimum operating range. These aforementioned instantaneous limits are reported to higher-level control unit 4 (HCU) as the basis for coordination. The reported limits available in higher-level control unit 4 (HCU), i.e., base torque HCU_trqBs 30, minimum base torque HCU_trqBsMin 32 and minimum torque HCU_trqMin 34, specify the reported possible operating range and the reported optimum operating range. These limits are delayed in time with respect to the instantaneous limits ascertained by drive unit control unit 6 (ECU) due to second delay 12 (delay 2) which occurs during communication.

FIG. 1 also shows another setpoint torque HCU_trqDesEIM 52 provided by higher-level control unit 4 for the electric motor and a setpoint torque MCU_trqDesEIMIn 54 resulting after fifth delay 18.

Figure 2:
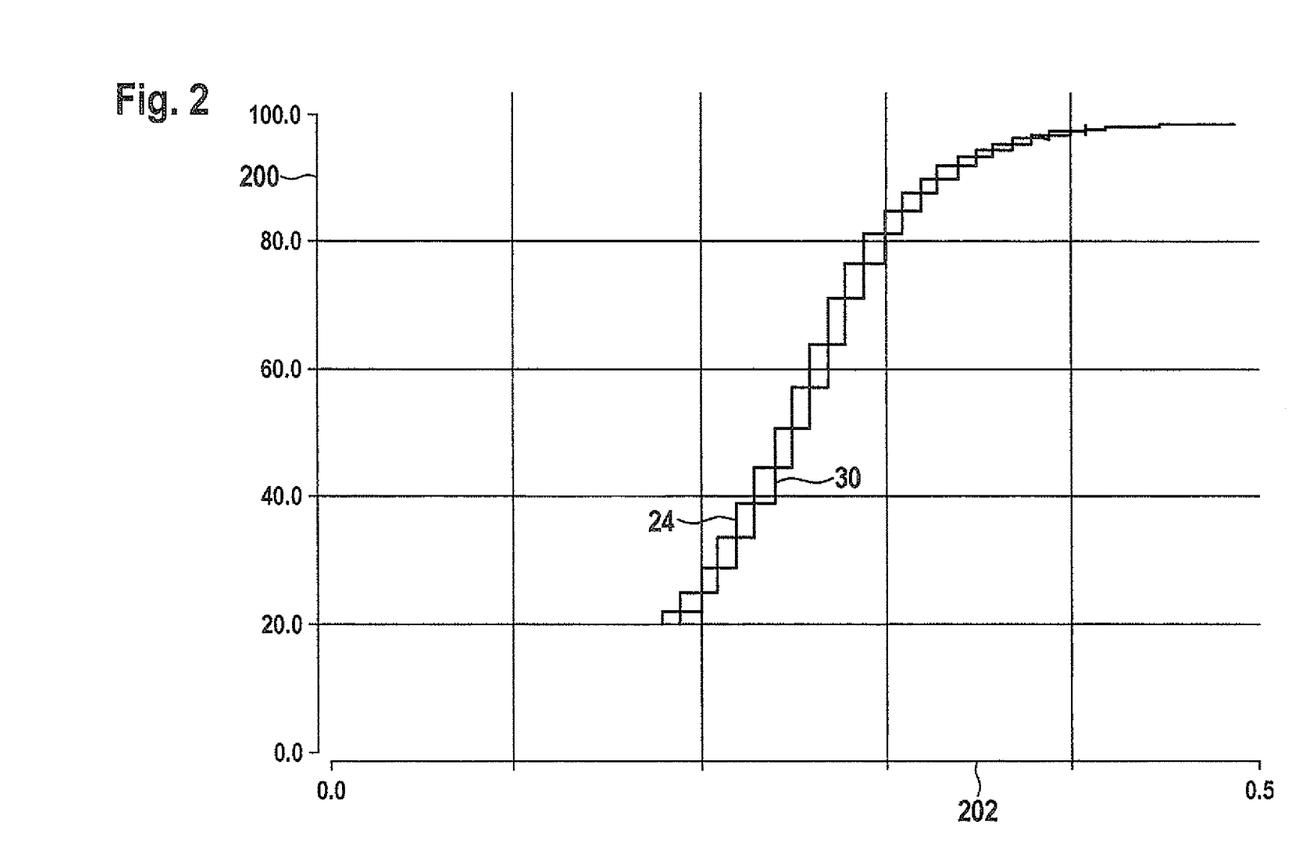
FIG. 2 shows a first diagram for operating parameters which are exchanged during operation of the system illustrated in FIG. 1.
Figure 3:
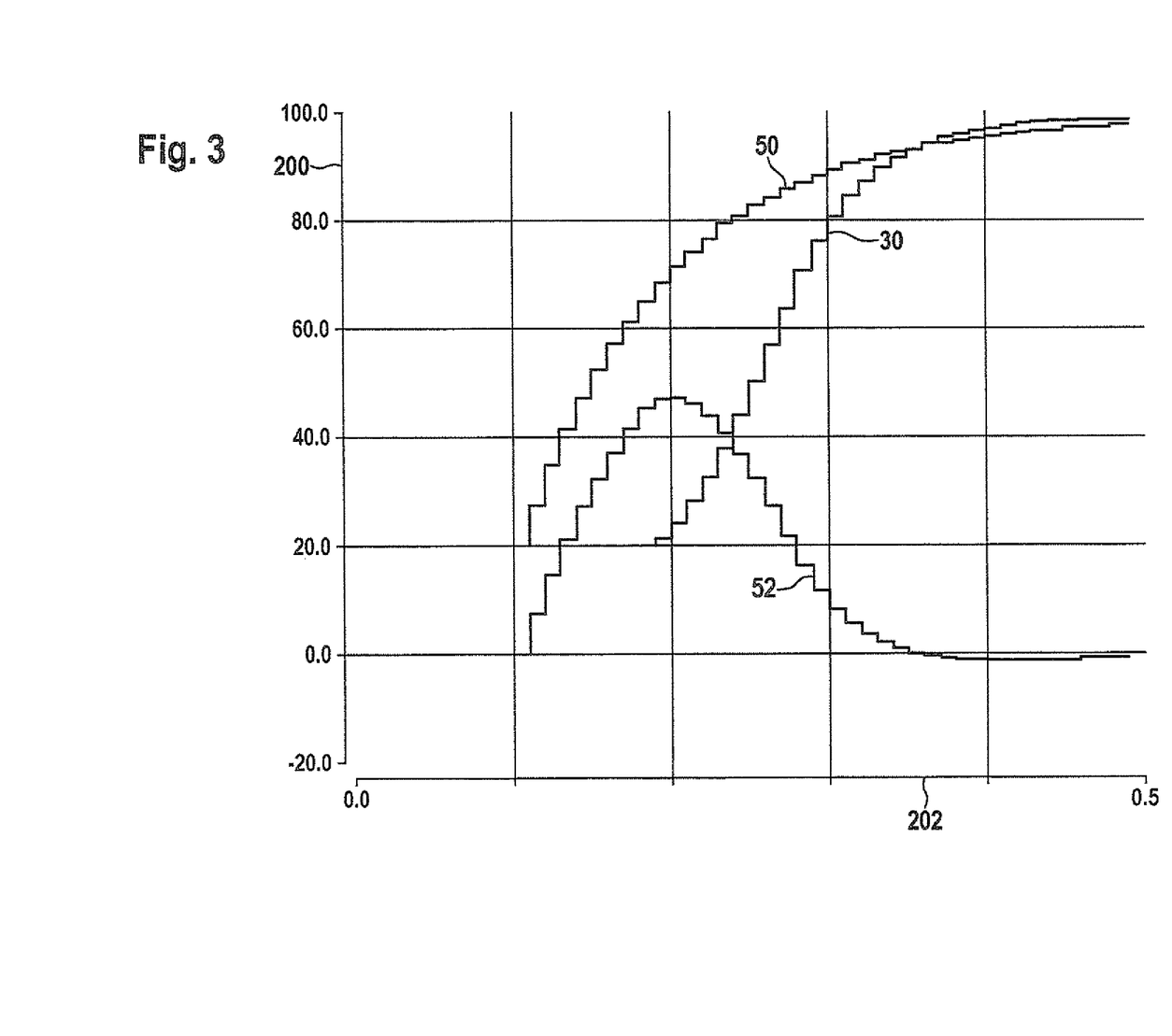
FIG. 3 shows a second diagram for operating parameters which are exchanged during operation of the system illustrated in FIG. 1.
Figure 4:
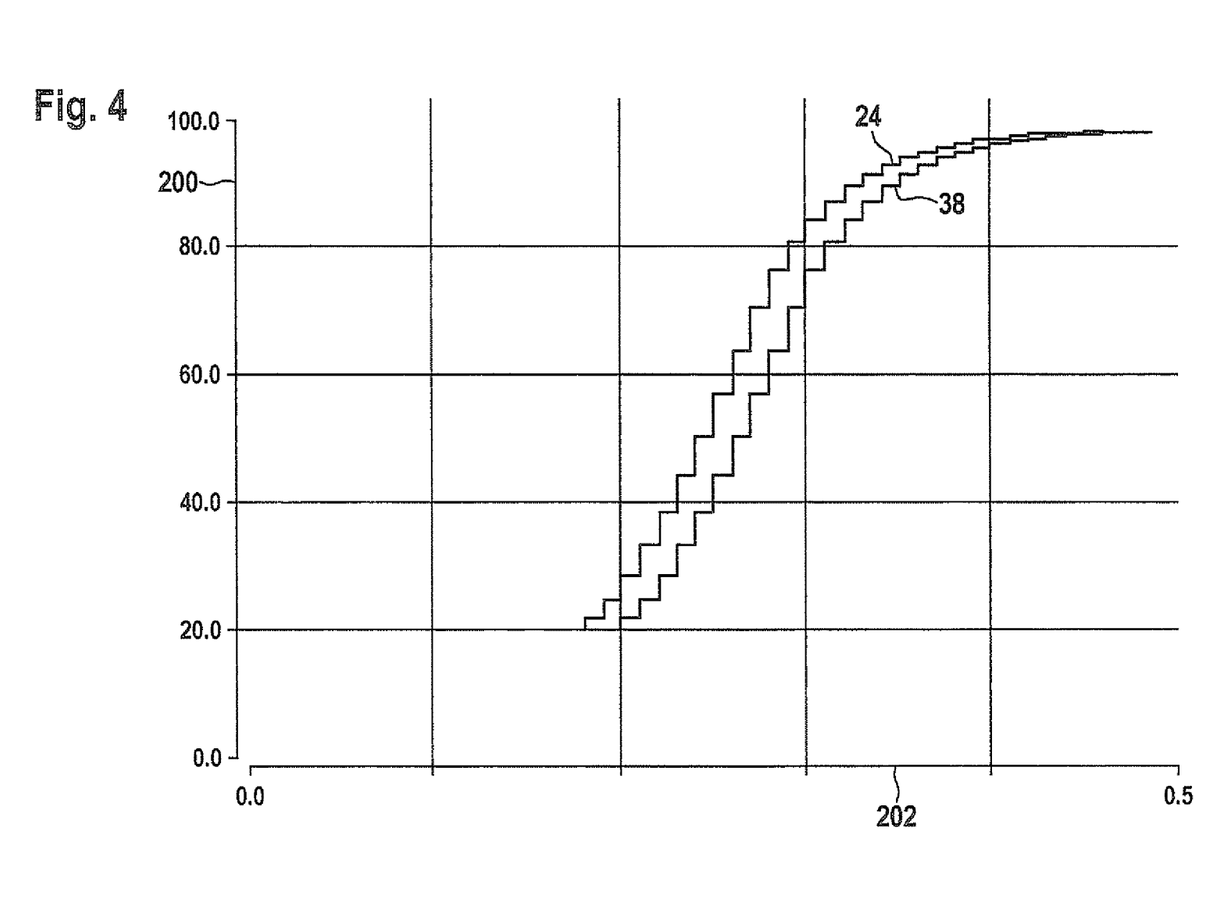
FIG. 4 shows a third diagram for operating parameters which are exchanged during operation of the system illustrated in FIG. 1.
Figure 7:
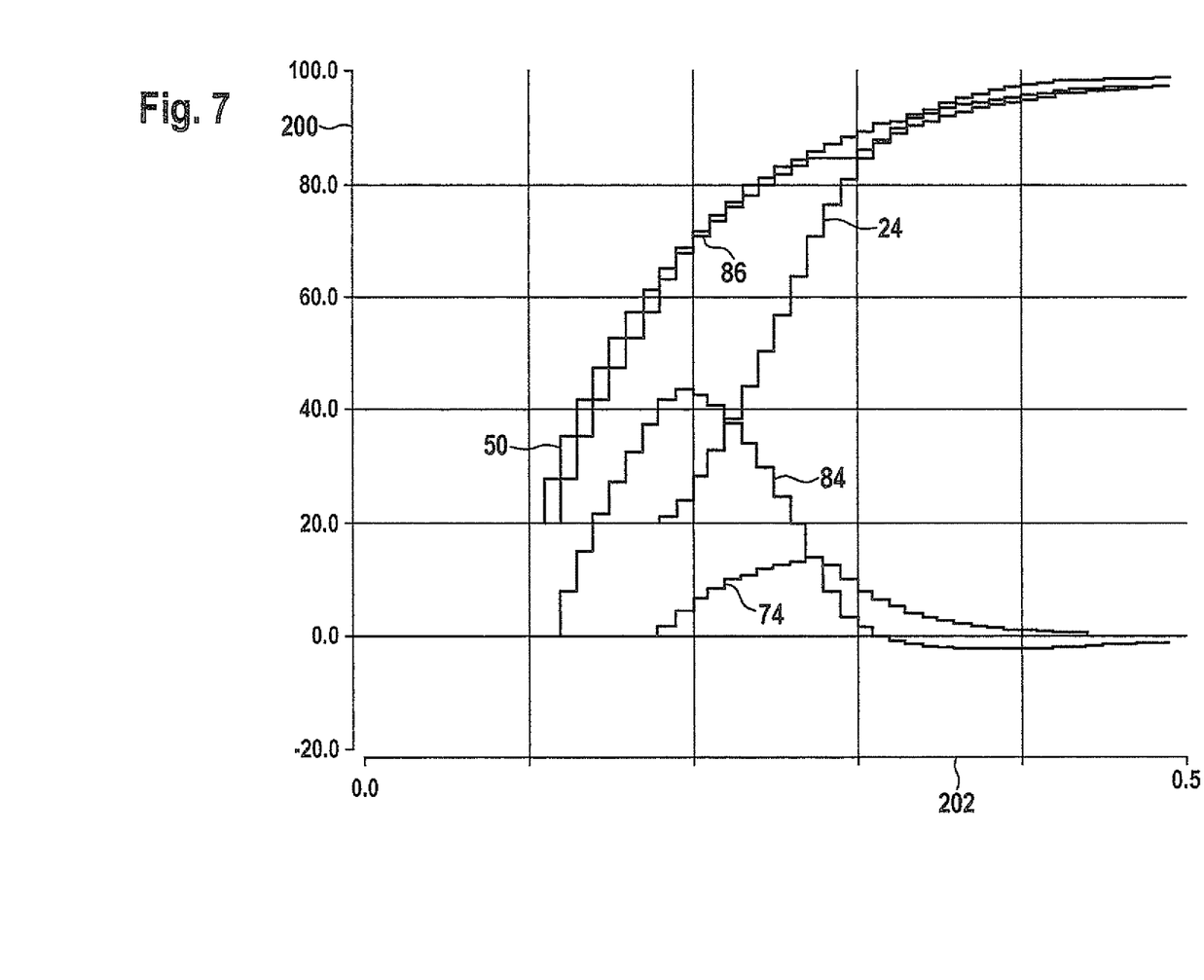
FIG. 7 shows a schematic representation of a diagram having operating parameters which are exchanged in the specific embodiment of the method according to the present invention described on the basis of FIGS. 5 and 6.

In the diagrams in FIG. 2 through 4, as well as in the diagram in FIG. 7, values for individual operating parameters which are exchanged during communication are plotted along a vertically oriented axis 200 over a horizontally oriented axis 202 for time.

The diagram from FIG. 2 shows the time curves of instantaneous base torque ECU_trqBs 24 and reported base torque HCU_trqBs 30 by way of example. Second delay 12 is apparent therein.

The instantaneous limits for a maximum torque MCU_trqMaxEIM 40 and a minimum torque MCU_trqMinEIM 42 of the electric motor ascertained in second drive unit control unit 8 (MCU) for the electric motor are also available in higher-level control unit 4 (HCU) only after a time delay as reported limits for a maximum torque HCU_trqMaxEIM 44 and a minimum torque HCU_trqMinEIM 46, due to fourth delay 16.

In the diagram in FIG. 3, the coordination in higher-level control unit 4 (HCU) is shown on the basis of an abrupt change in a driver-requested torque from 20 Nm to 100 Nm at point in time t=0.1 seconds. To avoid exciting drivetrain vibrations, a driver-requested torque or total setpoint torque HCU_trqDesFlt 50 is lowpass filtered. This driver-requested torque must be provided by the internal combustion engine and the electric motor. Reported base torque HCU_trqBs 30 follows lead setpoint torque HCU_trqLeadEng 20 after a time delay, which takes place on the basis of dynamic effects in the intake manifold of the internal combustion engine and the delay in communication. The coordination in higher-level control unit 4 (HCU) attempts to operate the internal combustion engine at an ideal ignition angle and, for this purpose, sets setpoint torque HCU_trqDesEng 36 to the same value as reported base torque HCU_trqBs 30. Setpoint torque HCU_trqDesEIM 52 for the electric motor compensates the difference from filtered total setpoint torque HCU_trqDesFlt 50, so that the following applies:

$$HCU\_trqDesEng\ HCU\_trqDesEIM = HCU\_trqDesFlt \quad (F2)$$

For the coordination according to the diagram in FIG. 3, the diagram in FIG. 4 shows instantaneous base torque ECU_trqBs 24 ascertained in drive unit control unit 6 for the internal combustion engine and setpoint torque ECU_trqDesEngIn 38, which is reported by higher-level control unit 4 (HCU) to drive unit control unit 6 (ECU) for the internal combustion engine and which is delayed by 10 milliseconds with respect to setpoint torque HCU_trqDesEng 36.

Although higher-level control unit 4 (HCU) tries to operate the internal combustion engine at an ideal ignition angle, reported setpoint torque ECU_trqDesEngIn 38 is delayed with respect to instantaneous base torque ECU_trqBs 24 by 20 milliseconds due to the double delay and therefore deviates by up to approximately 15 Nm therefrom. Without any further action being taken, a deviation from the ideal ignition angle and thus from the ideal efficiency occurs, which increases fuel consumption and exhaust gas emissions.

Figure 5:
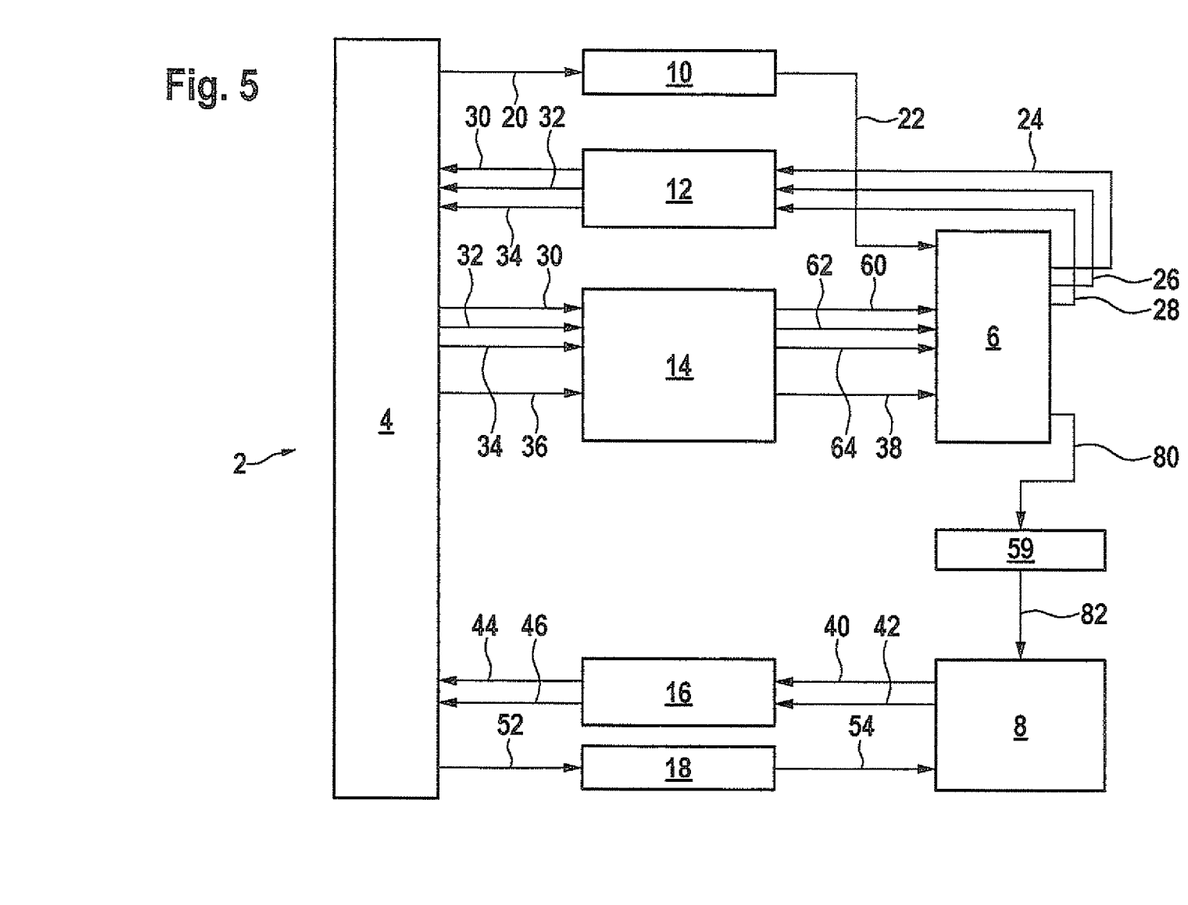
FIG. 5 shows the system described on the basis of FIG. 1, including operating parameters which are exchanged between the control units in a specific embodiment of the method according to the present invention.

FIG. 5 shows a schematic representation of system 2 from FIG. 1 in one embodiment of the method according to the present invention. In addition, FIG. 5 shows a sixth delay 59 and associated correction values ECU_trqCorrEIM 80 and MCU_trqCorrEIMIn 82.

The reported limits available in higher-level control unit 4 (HCU), and thus the operating parameters of the operating range, in this case base torque HCU_trqBs 30, a minimum base torque HCU_trqBsMin 32 and a minimum torque HCU_trqMin 34, are reported back to drive unit control unit 6 (ECU) for the internal combustion engine, together with setpoint torque HCU_trqDesEng 36 ascertained in higher-level control unit 4 (HCU) as a setpoint operating point, and these limits are received after a time delay in drive unit control unit 6 (ECU) for the internal combustion engine as reported-back base torque ECU_trqBsIn 60, reported-back minimum base torque ECU_trqBsMinIn 62, reported-back minimum torque ECU_trqMinln 64 and setpoint torque ECU_trqDesEngln 38. Drive unit control unit 6 (ECU) for the internal combustion engine thus additionally receives information on the basic conditions which were valid in higher-level control unit 4 (HCU) for the coordination or determination of reported setpoint torque ECU_trqDesEngln 38. For example, if reported setpoint torque ECU_trqDesEngln 38 corresponds to reported-back base torque ECU_trqBsln 60, higher-level control unit 4 (HCU) has tried to operate the internal combustion engine at the ideal ignition angle.

Based on these operating parameters, which are present as the four aforementioned torques, a correction of reported setpoint torque ECU_trqDesEngln 38 is carried out in drive unit control unit 6 (ECU) for the internal combustion engine.

Figure 6:
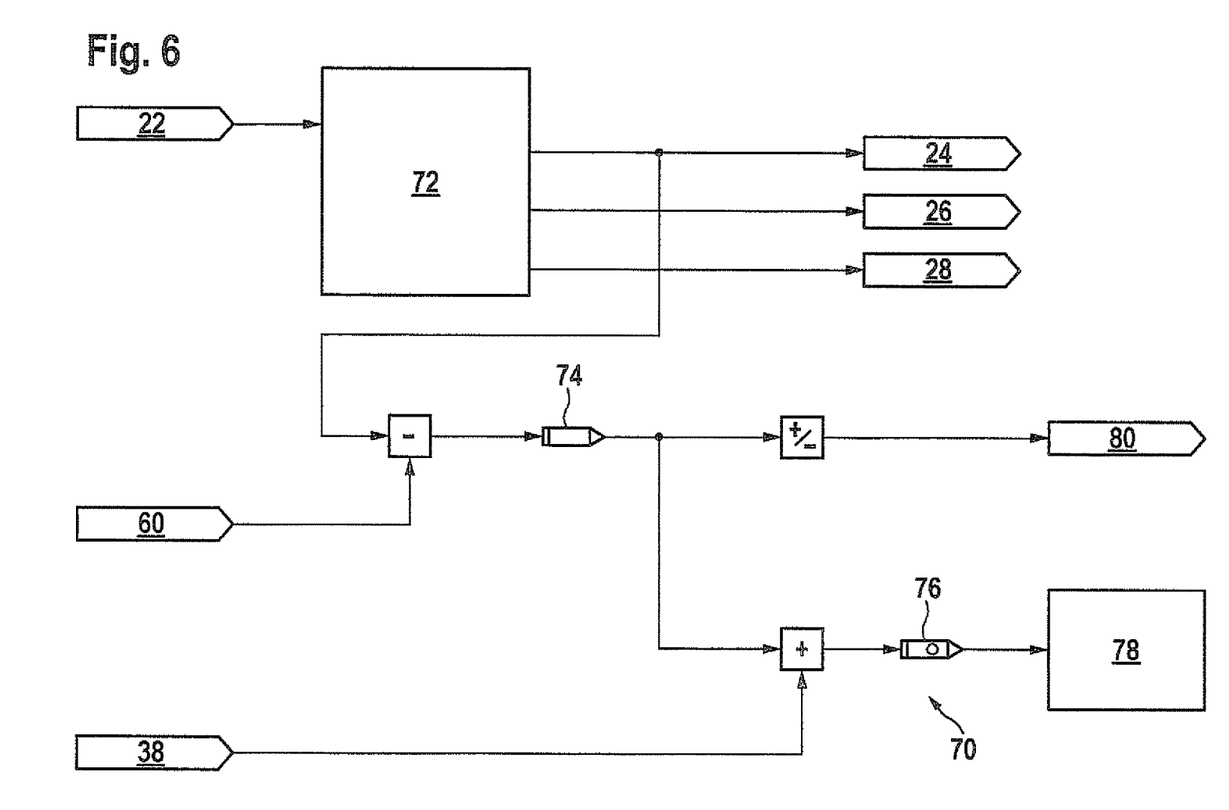
FIG. 6 shows details of the specific embodiment of the method according to the present invention described on the basis of FIG. 5.

System 70 from FIG. 6 shows a possible correction method by way of example in the event that reported setpoint torque ECU_trqDesEngln 38 lies in the vicinity of reported-back base torque ECU_trqBsln 60. The air path of the internal combustion engine, which ascertains, among other things, instantaneous base torque ECU_trqBs 24, is modeled in block ECU_LeadPath/Limits 72 shown herein for drive unit control unit 6 of the internal combustion engine.

A first correction value ECU_trqCorr 74 is calculated from the difference between instantaneous base torque ECU_trqBs 24 and reported-back base torque ECU_trqBsln 60:

$$ECU\_trqCorr = ECU\_trqBs - ECU\_trqBsln \quad (F3)$$

This correction value is added to reported setpoint torque ECU_trqDesEngln 38, which results in a setpoint torque ECU_trqDesEng 76 to be provided, which is forwarded to the activation of the control element, for example by ignition output stages, etc., represented by block Eng_Control 78. If reported setpoint torque ECU_trqDesEngln 38 corresponds to reported-back base torque ECU_trqBsln 60, setpoint torque ECU_trqDesEng 76 to be provided corresponds to instantaneous base torque ECU_trqBs 24 as a result of the correction, and the internal combustion engine is thus operated at the ideal ignition angle.

To prevent corruption of the total torque jointly generated by the internal combustion engine and the electric motor, a further correction value ECU_trqCorrEIM 80, which is derived from correction value ECU_trqCorr 74 by changing the sign, is calculated for the electric motor:

$$ECU\_trqCorrEIM = -ECU\_trqCorr \quad (F4)$$

and it is reported by drive unit control unit 6 (ECU) of the internal combustions engine to drive unit control unit 8 (MCU) of the electric motor. Once again, a time delay of 10 milliseconds is assumed. Simulations show that, although this delay corrupts the total torque, the effect is slight, since the change in correction value ECU_trqCorrEIM 80 over time is usually limited. Resulting delayed correction value MCU_trqCorrEIMln 82, which is available in drive unit control unit 8 (MCU) of the electric motor, is added to delayed setpoint torque MCU_trqDesEIMln 54, which is reported to higher-level control unit 4 (HCU) and is also delayed by 10 milliseconds. Thus, the following is derived for setpoint torque MCU_trqDesEIM 84 to be provided by the electric motor:

$$MCU\_trqDesEIM = MCU\_trqDesEIMln + MCU\_trqCorrEIMln. \quad (F5)$$

The diagram in FIG. 7 shows the time curves for a coordination in higher-level control unit 4 (HCU) according to the diagram in FIG. 3 for an abrupt change in a driver-requested torque from 20 Nm to 100 Nm at point in time t=0.1 seconds. Internal combustion engine setpoint torque ECU_trqDesEng 76 to be provided matches instantaneous base torque ECU_trqBs 24. The internal combustion engine is operated at the ideal ignition point. A total setpoint torque trqDesSum 86, which include the setpoint torques to be provided:

$$trqDesSum = ECU\_trqDesEng + MCU\_trqDesEIM \quad (F6)$$

approximately corresponds to filtered total setpoint torque HCU_trqDesFlt 50 and is delayed by 10 milliseconds. In the range of t=0.3 seconds, a slightly greater deviation of approximately 5 Nm arises, due to time variations (gradient) in correction value ECU_trqCorr 74, which are larger according to amount, in connection with the delayed conversion of the correction value by sixth delay 59 at the electric motor. On the whole, the result is a favorable behavior, since the deviation lies within the range of the conversion precision of the drive units.

If necessary, the gradient of correction value ECU_trqCorr 74 may be limited, which reduces the deviation in total setpoint torque trqDesSum 86 and requires minimal intervention into the ignition angle at the internal combustion engine.

The correction method illustrated on the basis of FIG. 6 is to be viewed as an example. A further option is to select correction value ECU_trqCorr 74 in such a way that following equation F7 is applied to setpoint torque ECU_trqDesEng 76 to be provided for drive unit control unit 6:

$$(ECU\_trqDesEng - ECU\_trqBsMin)/(ECU\_trqBs - ECU\_trqBsMin) = (ECU\_trqDesEngln - ECU\_trqBsMinln)/(ECU\_trqBsln - ECU\_trqBsMinln) \quad F7)$$

if $$ECU\_trqBsMinln \le ECU\_trqDesEngln \le ECU\_trqBsln. \quad (F8)$$

As a result:

$$ECU\_trqDesEng = ECU\_trqBs \text{ if } ECU\_trqDesEngln = ECU\_trqBsln \quad (F9)$$

or $$ECU\_trqDesEng = ECU\_trqBsMin \text{ if } ECU\_trqDesEngln = ECU\_trqBsMinln \quad F10)$$

Therefore, a linear mapping is selected within the torque range which may be set by retarding the ignition angle. A similar mapping may be selected for the torque range which may be represented by injection blank-out, using:

$$ECU\_trqMinln \le ECU\_trqDesEngln < ECU\_trqBsMinln \quad (F11)$$

Other nonlinear mappings are also possible.

The described method may be used to prevent reductions in efficiency and to enable optimum dynamic coordination of the drive units, despite time delays in communication between multiple control units 4 and/or drive unit control units 6, 8.

The reported limits, and the operating parameters of the operating range, in this case base torque HCU_trqBs 30, a minimum base torque HCU_trqBsMin 32 and a minimum torque HCU_trqMin 34, are reported back to drive unit control unit 6 (ECU) for the internal combustion engine as a setpoint operating point, together with setpoint torques HCU_trqDesEng 36 ascertained in higher-level control unit 4 (HCU). If the behavior of the reported limits is highly dynamic, a dynamic correction of the variables reported back to drive unit control unit 6 (ECU) may take place in higher-level control unit 4 (HCU) on the basis of the gradients thereof. These corrected variables are then reported back to drive unit control unit 6 (ECU). This makes it possible to at least partially compensate for time delays.

Associated variables should be transmitted at the same time or together. For example, if a CAN bus system is used for communicating between the control units, the reported limits, and thus operating parameters of the operating range, in this case base torque HCU_trqBs 30, a minimum base torque HCU_trqBsMin 32 and a minimum torque HCU_trqMin 34, should be transmitted together in a CAN message. The variables reported back to drive unit control unit 6 (ECU), including the setpoint operating point, should also all be provided in a common CAN message and thus transmitted at the same time.

Among other things, due to the joint reporting back of base torque ECU_trqBsln 60, minimum base torque ECU_trqBsMinln 62 and minimum torque ECU_trqMinln 64, together with setpoint torque ECU_trqDesEngln 38, the illustrated method is unaffected by varying time delays in the communication between multiple control units 4 and/or drive unit control units 6, 8, whose processing cycles are not typically synchronized with each other.

What is claimed is:

1. A method for coordinating at least one drive unit of a vehicle, said at least one drive unit being assigned at least one control unit which is designed as a drive unit control unit, a higher-level control unit being provided and information being exchanged between the control units, the method comprising:
   transmitting at least one operating parameter for an operating range of the at least one assigned drive unit to the higher-level control unit by at least one drive unit control unit;
   ascertaining a setpoint operating point for the at least one drive unit by using the higher-level control unit on the basis of the at least one received operating parameter; and
   transmitting the ascertained setpoint operating point to the at least one drive unit control unit together with the at least one operating parameter, wherein a first base torque is transmitted by the at least one drive unit control unit at a first point in time as the at least one operating parameter; the transmitted first base torque is delayed during transmission between the at least one drive unit control unit and the higher-level control unit, a delayed, a second base torque is derived from the transmitted, first base torque as the at least one operating parameter, which reaches the higher-level control unit at a second point in time; a first setpoint torque is ascertained from the second base torque as a setpoint operating point by the higher-level control unit; the first setpoint torque and the second base torque are transmitted together by the higher-level control unit; the first setpoint torque and the second base torque are delayed during transmission between the higher-level control unit and the at least one drive unit control unit; and a delayed, third base torque is derived from the second base torque as the at least one operating parameter, and a delayed, second setpoint torque is derived from the first setpoint torque as the setpoint operating point, which together reach the at least one drive unit control unit at a third point in time.

2. The method as recited in claim 1, wherein the received setpoint operating point and the at least one received operating parameter are compared with each other by the at least one drive unit control unit.

3. The method as recited in claim 1, wherein the received setpoint operating point and the at least one received operating parameter are compared with each other by the at least one drive unit control unit.

4. The method as recited in claim 1, wherein at least one instantaneous operating parameter is determined by the drive unit control unit after receipt of the setpoint operating point and the at least one operating parameter for an instantaneous operating range of the at least one drive unit, and the received setpoint operating point being corrected on the basis of the at least one received operating parameter and the at least one instantaneously determined operating parameter.

5. The method as recited in claim 1, wherein at least one instantaneous operating parameter is determined by the drive unit control unit after receipt of the setpoint operating point and the at least one operating parameter for an instantaneous operating range of the at least one drive unit, and the received setpoint operating point being corrected on the basis of the at least one received operating parameter and the at least one instantaneously determined operating parameter.

6. The method as recited in claim 2, wherein at least one instantaneous operating parameter is determined by the drive unit control unit after receipt of the setpoint operating point and the at least one operating parameter for an instantaneous operating range of the at least one drive unit, and the received setpoint operating point being corrected on the basis of the at least one received operating parameter and the at least one instantaneously determined operating parameter.

7. The method as recited in claim 4, wherein a value for a correction of the setpoint operating point received by the at least one drive unit control unit is formed from a difference between the at least one instantaneously determined operating parameter and the at least one received operating parameter and added to the received setpoint operating point.

8. The method as recited in claim 5, wherein a value for a correction of the setpoint operating point received by the at least one drive unit control unit is formed from a difference between the at least one instantaneously determined operating parameter and the at least one received operating parameter and added to the received setpoint operating point.

9. The method as recited in claim 6, wherein a value for a correction of the setpoint operating point received by the at least one drive unit control unit is formed from a difference between the at least one instantaneously determined operating parameter and the at least one received operating parameter and added to the received setpoint operating point.

10. The method as recited in claim 4, wherein a value for correcting the setpoint operating point received by the at least one drive unit control unit is determined by forming a linear mapping, taking into account the at least one instantaneously determined operating parameter and the at least one received operating parameter.

11. The method as recited in claim 7, wherein a value for correcting the setpoint operating point received by the at least one drive unit control unit is determined by forming a linear mapping, taking into account the at least one instantaneously determined operating parameter and the at least one received operating parameter.

12. The method as recited in claim 4, wherein a limit for a correction value is transmitted between the control units as at least one parameter in addition to the at least one operating parameter.

13. The method as recited in claim 7, wherein a limit for a correction value is transmitted between the control units as at least one parameter in addition to the at least one operating parameter.

14. The method as recited in claim 10, wherein a limit for a correction value is transmitted between the control units as at least one parameter in addition to the at least one operating parameter.

15. The method as recited in claim 4, wherein the correction is influenced as a function of an operating state of the at least one drive unit or drivetrain.

16. The method as recited in claim 4, wherein the correction method is selected as a function of an operating state of the at least one drive unit or drivetrain.

17. The method as recited in claim 4, wherein the correction is reported to the higher-level control unit or at least one further drive unit control unit, and at least one further drive unit is influenced thereby.

18. A system for coordinating at least one drive unit of a vehicle which includes at least one control unit, the at least one drive unit being assigned at least one control unit designed as a drive unit control unit, a higher-level control unit being provided, and information being exchanged between the control units, the at least one drive unit control unit being designed to transmit at least one operating parameter for an operating range of the at least one assigned drive unit to the higher-level control unit, the higher-level control unit being designed to ascertain a setpoint operating point for the at least one drive unit on the basis of the at least one received operating parameter and to transmit the ascertained setpoint operating point to the at least one drive unit control unit together with the at least one operating parameter, wherein a first base torque is transmitted by the at least one drive unit control unit at a first point in time as the at least one operating parameter; the transmitted first base torque is delayed during transmission between the at least one drive unit control unit and the higher-level control unit, a delayed, a second base torque is derived from the transmitted, first base torque as the at least one operating parameter, which reaches the higher-level control unit at a second point in time; a first setpoint torque is ascertained from the second base torque as a setpoint operating point by the higher-level control unit; the first setpoint torque and the second base torque are transmitted together by the higher-level control unit; the first setpoint torque and the second base torque are delayed during transmission between the higher-level control unit and the at least one drive unit control unit; and a delayed, third base torque is derived from the second base torque as the at least one operating parameter, and a delayed, second setpoint torque is derived from the first setpoint torque as the setpoint operating point, which together reach the at least one drive unit control unit at a third point in time.

19. The system as recited in claim 18, wherein a drive unit control unit is designed as the higher-level control unit.

\* \* \* \* \*